Dec. 11, 1951 A. J. HENQUET ET AL 2,577,759

TRUNK TELEPHONE OFFICE WITHOUT THREE CORDS

Filed July 23, 1947 2 SHEETS—SHEET 1

INVENTORS
ANDRE JEAN HENQUET
MARCEL ROGER MAUGE
BY Robert Harding Jr.
ATTORNEY

TRUNK TELEPHONE OFFICE WITHOUT THREE CORDS

Filed July 23, 1947 2 SHEETS—SHEET 2

INVENTORS
ANDRE JEAN HENQUET
MARCEL ROGER MAUGE
BY Robert Harding Jr.
ATTORNEY

Patented Dec. 11, 1951

2,577,759

UNITED STATES PATENT OFFICE 2,577,759

TRUNK TELEPHONE OFFICE WITHOUT THREE CORDS

Andre Jean Henquet and Marcel Roger Mauge, Boulogne-Billancourt, France, assignors to International Standard Electric Corporation, New York, N. Y., a corporation of Delaware Application July 23, 1947, Serial No. 763,062
In France November 13, 1942

Section 1, Public Law 690, August 8, 1946
Patent expires November 13, 1962

8 Claims. (Cl. 179—27)

The present invention relates to trunk telephone exchanges that do not employ the plug ended or triple-cords generally used for interconnecting 1st class circuits. These triple-cords, which make it possible to extend the four wires of 1st class circuits in order to effect the linking of two conversation channels, suffer from serious drawbacks, particularly that of crowding the equipment of the toll boards and complicating the tasks of the operators.

The present invention consequently aims at providing trunk telephone exchange arrangements that make it possible to handle the traffic by means of the usual two plug ended or double-cords, irrespective of the connections to be established.

According to certain features of the invention, this purpose is attained by the use of a diversion circuit which is permanently provided in the exchange's equipment and which is automatically brought into play every time it is necessary to link two 1st class conversation channels, the manual operations remain the same as for lower class circuits, in other words, plugging in by the operator with her double-cord. The exchange's equipment is however arranged so as to provide normal service for lower class circuit connections.

Figure 3:
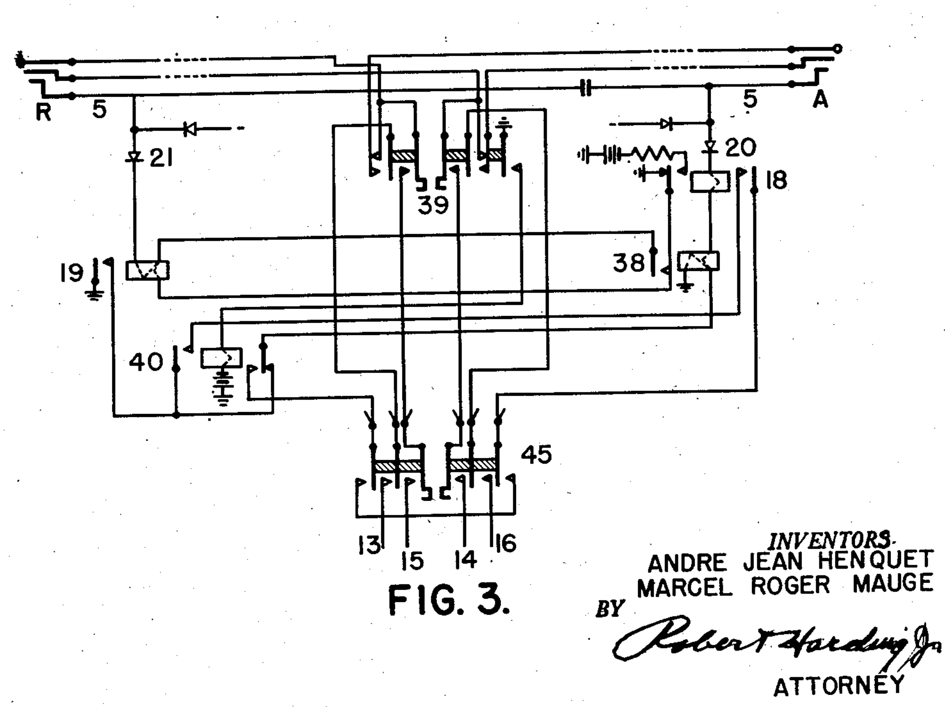

Similarly, Fig. 3 shows a portion of the double-cord at the operator's position.

Figure 4:
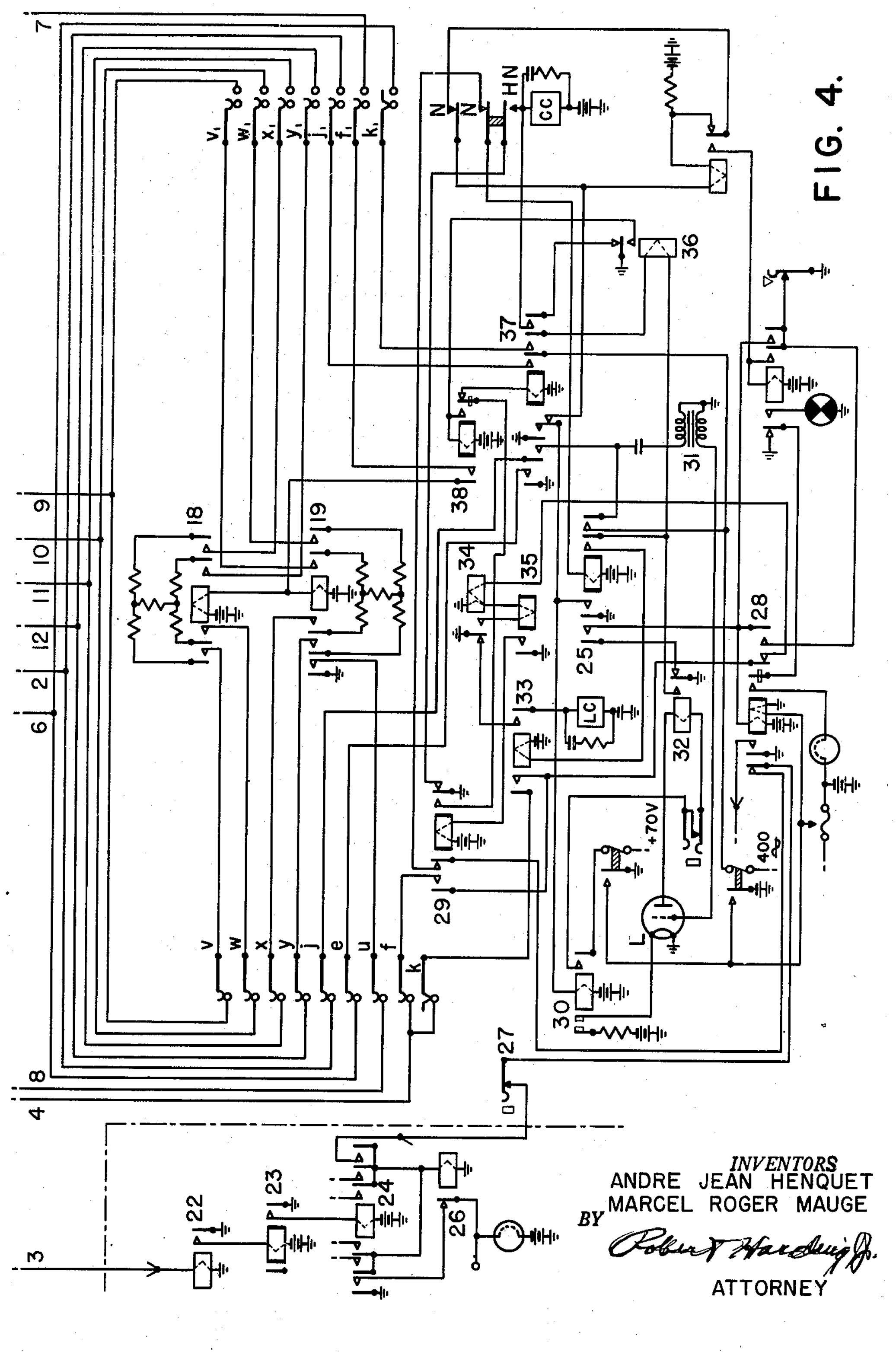

Fig. 4 shows an example of a 4-wire link circuit for linking together 1st class circuits, according to features of the invention.

Figure 1:
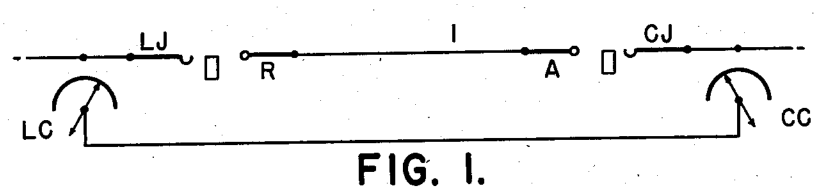
Fig. 1 shows the general scheme for connecting together two 1st class circuits.

As shown in Fig. 1, the general scheme for 1st class circuit connections comprises, according to features of the invention, a diversion circuit having finders LC and CC arranged to seize jacks LJ and CJ respectively into which the operator can plug the double-cord 1 in the usual way, the plugs of this cord being indicated by R and A respectively.

With an arrangement of this kind, the method of operation for calling or answering over a 1st class circuit is the same for the operator as the method of operating over lower class circuits. In both cases, the operator plugs in by means of her double-cord 1. If the connection has to be extended to a second, third or fourth class circuit, terminal box T of Fig. 2 remains in 2-wire connection, and the connection is made in the usual way over the double-cord.

If, on the other hand, two 1st class circuits are connected by the cord, these circuits being characterized by a low resistance wire 17 (Fig. 2) with positive potential, relays 18 and 19 of Fig. 3 operate, being respectively polarized by the rectifier elements 20 and 21. Relay 18 connects the winding of relay 19 to the negative battery instead of to ground. This substitution causes the pulling up of relay 18 of the calling circuit (Fig. 2), a relay that only operates for a very strong current obtained by the connection in series of the positive battery and the negative battery.

This relay 18 causes relay 22 (Fig. 4) to pull up in the circuit: battery, operating contact of 18, wire 3 (Fig. 2), grounded winding of relay 22 (Fig. 4).

When relay 22 operates, relays 23 and 24 operate and cause the pulling up of relays 25 of all the idle circuits in the circuit: ground on the winding of 26, operating contact of 24, and in multiple, jack 27, rest contact of relay 28, rest contact of 29, normal contact of finder CC, winding of relay 25, battery.

In order to prevent a circuit, whose amplifier tube L does not operate, from becoming connected to the calling circuit, the following arrangement is provided according to another feature of the invention.

Upon operating, relay 25 causes the pulling up of relay 30 that feeds amplifier tube L with heating current. Furthermore, the operation of relay 25 connects grid transformer 31 of this tube to the source of potential, e. g. of 400 C. P. S.

If then tube L operates normally, relay 32 pulls up and actuates relay 33 over an operating contact of relay 25. Relay 33 connects relay 34 to wiper *k* of finder LC across a rest contact of 28, and also connects the electromagnetic clutch of this finder to the rest contact of relay 34. The rotation of finder LC takes place under the control of relay 34, which becomes actuated upon meeting the potential applied by operating relay 18 (Fig. 2) to the corresponding wire 4, and stops the finder. Relay 34, upon becoming actuated, prevents the double test in the known manner, and relays 35 and 29 become energized in cascade.

When finder LC has stopped at the calling 1st class circuit, the setting of finder CC of the diversion circuit to the called 1st class circuit is effected as follows, under the control of relays 32 and 36.

Relay 32 is connected to wire 2 to be reached over the circuit: relay 32, the anode and grid of amplifier tube L, and grid transformer 31, operating contact of relay 37, wiper and contact j of LC, wire 2, sleeve of jack LJ of the calling 1st class circuit (Fig. 2), wire 5 of answering plug R (Fig. 3), condenser, wire 5 of calling plug A, sleeve of jack CJ of the called 1st class circuit (Figs. 1 and 2), contact j1 of finder CC (Fig. 4), 37 front 25 front and back to transformer 31.

Furthermore, the operation of relay 37 causes the rotation of finder CC under the control of the rest contact of relay 36. The finder rotates with a 400 C. P. S. potential applied to its contact j1 over an operating contact of relay 37.

When finder CC is connected to contact j1 to which relay 32 is connected, this relay becomes actuated. In order to prevent finder CC from being stopped at a wrong position by the operation of this relay, which might occur upon passage of finder CC to the position corresponding to the calling 1st class circuit as well as to the position corresponding to the called 1st class circuit, the circuit is arranged in such a way that the pulling up of relay 32 is not sufficient to stop the hunting. Relay 32 connects relay 36 into the circuit of contact k1, and relay 36 becomes energized with the potential furnished by wire 6 of Figs. 2 and 4 on condition that contact k1 is not the one corresponding to the calling circuit because, at that position, a ground is connected through the intermediary of operating relay 37 and wiper e of finder LC.

Upon operating, relay 36 shops the rotation of finder CC and effects the pulling up of relay 38.

According to another feature of the invention, finder CC starts from a normal position instead of starting from any position in order to prevent the possible occurrence of a wrong connection if two simultaneous huntings took place and finder CC of connection No. 1 should meet relay 32 of connection No. 2 at the moment when finder CC of connection No. 2 met wiper k of connection No. 1.

Upon becoming actuated, relay 38 effects the release of relay 37, which stops the operation of the amplifier tube and connects relays 18 and 19 (Fig. 4) to contact f1 of the called circuit.

During the establishment of the connection, the monitoring key 39 (Fig. 3) of the two-cord is pressed down, and the connection remains a 2-wire one over this two-cord.

Figure 2:
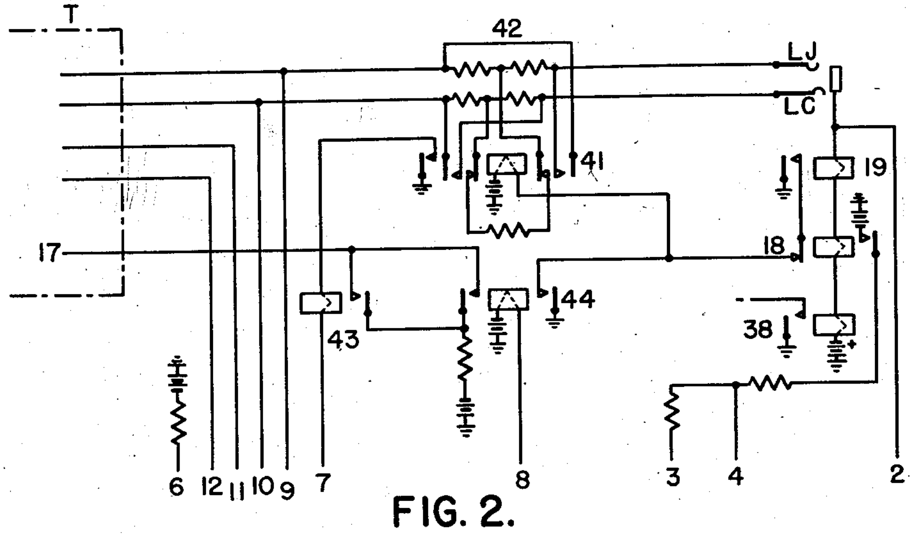
Fig. 2 shows the portion of an incoming or outgoing 1st class circuit that is necessary for describing the operation of trunk exchanges employing features of the invention.

When the operator lifts her monitoring key, relay 19 of Fig. 3 connects a low resistance ground over a rest contact of monitoring relay 40 to wire 5 of calling plug A, and this causes the pulling up of relay 19 of the called circuit (Fig. 2).

Relay 19 in its turn causes the pulling up of relay 41, which cuts out attenuator 42 and connects a ground to wire 7 in series with relay 43. This relay becomes actuated in series with relays 18 and 19 of Fig. 4 over an operating contact of relay 38.

Relay 19 (Fig. 4) causes the pulling up of relay 44 (Fig. 2) of the calling circuit over wiper U and wire 8.

Relay 44 effects the pulling up of relay 41 of the calling circuit, which cuts out the attenuator 42 of this circuit and gives a signal to the terminal box T to pass into 4-wire connection; terminal box T of the called circuit passes into 4-wire connection through the intermediary of relay 43 and wire 17.

The conversation takes place over contact banks *v, w, x, y, v1, w1, x1, y1*, of finders LC and CC, and the two-cord remains branched on the two talking channels in order to permit any necessary supervision through the intermediary of key 45 which transfers the talking channels to wires 13 to 16 respectively where the monitoring can be done through an amplifier, if necessary.

If the monitoring key 39 (Fig. 3) is pushed down without the intermediary of key 45, the low resistance ground is removed from the wire 5 of calling plug A, relay 19 (Fig. 2) of the called circuit releases, cancelling the operation of relays 18, 19, etc. (Fig. 4) as already described, and the call again becomes a 2-wire one over the two-cord without the 4-wire link circuit being released.

Upon withdrawal of the plug of one of the ends of the two-cord, relay 18 (Fig. 2) of the calling circuit falls back and releases the 4-wire link circuit of Fig. 4. A new call can be handled.

Although the invention has been described for one particular example of embodiment, it is evident that it is by no means limited to the same, but on the contrary is capable of numerous modifications and adaptations without departing from its scope.

What is claimed is:

1. A telephone exchange system comprising a plurality of lines including a calling line and a called line, a cord circuit connecting the calling and called lines, a plurality of switches each having a plurality of terminals multipled to said lines and a plurality of brushes, a switch driving system, means actuated by the connection of the cord circuit between the calling and called circuits for actuating the driving system, a plurality of supplemental circuits each connected at each end to the brushes of a different switch and means for arresting the switches when a switch connected to a supplemental circuit contacts the calling line.

2. A telephone exchange system comprising a plurality of lines including a calling line and a called line, a cord circuit connecting the calling and called lines, a plurality of hunting switches each having a plurality of terminals multipled to said plurality of lines and a plurality of brushes, a plurality of supplemental circuits each connected at each end to brushes of a different switch, first means actuated by a circuit extending through the cord circuit for driving idle switches until a switch connected to one end of a supplemental circuit contacts the calling line and thereupon arresting the switches, and second means for thereupon shifting the switch at the other end of the latter supplemental circuit into contact with the called line.

3. A system as set forth in claim 2 in which each line includes an attenutating arrangement and means for cutting out said attenuating arrangement when the line is connected to another line through the cord circuit and a supplemental circuit.

4. A system as set forth in claim 2 in which the supplemental circuit includes an attentuating arrangement, and means for connecting said attenuating arrangement between the calling and called lines after the supplemental circuit has been connected to the latter lines.

5. A telephone exchange system comprising a plurality of lines including a calling line and a called line, a cord circuit connecting the calling and called lines, a plurality of hunting switches each having terminals multipled to said plurality of lines and a plurality of brushes, a plurality of supplemental circuits each connected at each end to brushes of a different switch, and means for actuating said switches to connect a supplemental circuit to the calling and called lines including a switch driving arrangement and an actuating circuit therefor extending through the cord circuit and energized through connections to both the calling and the called line.

6. A system as set forth in claim 5 in which the actuating circuit includes two relays, an energizing circuit for one relay connected to the calling line and an energizing circuit for the second relay connected to the called line, said actuating circuit extending through normally open contacts of both of said relays.

7. A system as set forth in claim 5 in which each supplemental circuit includes a vacuum tube and the means for actuating the switches includes circuits passing through said tube, arranged to prevent operation of switches connected to a supplemental circuit which includes a defective tube.

8. A system as set forth in claim 5 in which the switch driving means includes an actuating circuit in the supplemental circuit, means for closing the latter circuit when the connections to the calling line are completed, and means for opening the latter circuit including a circuit extending from the connected supplemental circuit through the calling line, cord circuit and called line to the switch terminals and from said connected supplemental circuit to a brush of the driven switch connected to the latter circuit.

ANDRE JEAN HENQUET.
MARCEL ROGER MAUGE.

REFERENCES CITED

The following references are of record in the file of this patent:

UNITED STATES PATENTS

| Number | Name | Date |
| --- | --- | --- |
| 1,647,796 | Glezen | Nov. 1, 1927 |
| 1,708,982 | Vroom | Apr. 16, 1929 |
| 1,763,893 | Krecek | June 17, 1930 |
| 2,265,151 | Crocker | Dec. 9, 1941 |